United States Patent
Hoang et al.

(10) Patent No.: US 8,571,089 B2
(45) Date of Patent: Oct. 29, 2013

(54) TIME-SETTING IN SATELLITE POSITIONING SYSTEM RECEIVERS

(75) Inventors: Duong A. Hoang, San Diego, CA (US); Douglas Neal Rowitch, Del Mar, CA (US); Jie Wu, San Diego, CA (US); Emilija M. Simic, La Jolla, CA (US); Dominic Gerard Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 12/853,182

(22) Filed: Aug. 9, 2010

(65) Prior Publication Data

US 2012/0033716 A1 Feb. 9, 2012

(51) Int. Cl.
*H04B 1/00* (2006.01)
(52) U.S. Cl.
USPC .................................. 375/150; 375/E1.002
(58) Field of Classification Search
USPC ........................................................ 375/150
See application file for complete search history.

(56) References Cited

U.S. PATENT DOCUMENTS

| | | | |
|---|---|---|---|
| 5,798,732 A | 8/1998 | Eshenbach | |
| 5,812,087 A | 9/1998 | Krasner | |
| 6,052,081 A | 4/2000 | Krasner | |
| 6,239,742 B1 | 5/2001 | Krasner | |
| 6,377,209 B1 | 4/2002 | Krasner | |
| 6,583,757 B2 | 6/2003 | Krasner | |
| 6,597,311 B2 | 7/2003 | Sheynblat et al. | |
| 6,788,249 B1 * | 9/2004 | Farmer et al. | 342/357.62 |
| 6,907,224 B2 | 6/2005 | Younis | |
| 6,970,500 B1 * | 11/2005 | Sanders | 375/150 |
| 7,302,225 B2 | 11/2007 | Younis | |

(Continued)

FOREIGN PATENT DOCUMENTS

| GB | 2465492 A | 5/2010 |
|---|---|---|
| WO | 2009079380 A2 | 6/2009 |

OTHER PUBLICATIONS

International Search Report and Written Opinion—PCT/US2011/046821—ISA/EPO—Mar. 9, 2012.
Krumvieda, et al., "A Complete IF Software GPS Receiver". A Tutorial about the Details, The Institute of Navagation, GPS 2001, Sep. 11-14, 2001, pp. 789-829, Salt Lake City, UT, USA.
Syrjarinne J: "Possibilities for GPS Time Recovery with GSM Network Assistance", Proceedings of the Institute of Navigation (ION) GPS, XX, XX, Sep. 19, 2000, pp. 955-965, XP002315980.

*Primary Examiner* — Shuwang Liu
*Assistant Examiner* — Nader Bolourchi
(74) *Attorney, Agent, or Firm* — Linda Gunderson; Mary A. Fales

(57) ABSTRACT

Techniques are provided which may be implemented using various methods and/or apparatuses in a receiver and/or other like device to determine an SPS time using SPS signals based on a correlation process. A verification process may be performed, for example, that verifies a maximum peak in comparison with other peak information resulting from the correlation process, for example, by considering a ratio of a maximum peak to a next maximum peak. A time-setting algorithm may be selected, for example, based, at least in part, on a time uncertainty and/or on a type of demodulation performed on the SPS signal. The time-setting algorithm may operatively control one or both of the correlation and/or verification processes in a desired manner given the time uncertainty and/or type/mode of demodulation performed.

52 Claims, 5 Drawing Sheets

(56) References Cited

U.S. PATENT DOCUMENTS

| | | |
|---|---|---|
| 2003/0151547 A1 | 8/2003 | Mauro et al. |
| 2005/0174284 A1* | 8/2005 | Abraham et al. ........ 342/357.09 |
| 2006/0031696 A1 | 2/2006 | King et al. |
| 2008/0079633 A1 | 4/2008 | Pon et al. |
| 2009/0010239 A1 | 1/2009 | Yeh et al. |
| 2009/0219202 A1 | 9/2009 | Pon |
| 2009/0289849 A1 | 11/2009 | Mantovani |
| 2010/0007554 A1 | 1/2010 | Wang et al. |
| 2010/0134349 A1 | 6/2010 | Lennen et al. |

* cited by examiner

TIME-SETTING IN SATELLITE POSITIONING SYSTEM RECEIVERS

BACKGROUND

1. Field

The subject matter disclosed herein relates to electronic devices, and more particularly to methods and apparatuses for use in or with a device capable of receiving an SPS signal.

2. Information

The Global Positioning System (GPS), as well as other Global Navigation Satellite Systems (GNSS), rely on measurement of propagation delays of signals transmitted from space vehicle (SV) transmitters to receivers (e.g., ground-based navigation receivers). By measuring such a propagation delay, a receiver may obtain a pseudorange measurement to an associated transmitting SV. By obtaining such pseudorange measurements to four or more SVs at known orbital positions relative to the earth, a receiver may compute an estimated location of the receiver as part of a navigation solution, for example.

By way of example, certain GPS signals are modulated by a data signal comprising 30.0 second sequential data frames. Each frame includes five six-second sub-frames. Each sub-frame includes a 62-bit preamble followed by clock correction data, ephemeris data and/or almanac data. The first word in the 62-bit preamble is a TLM (telemetry word) which contains information about the age of the ephemeris data. The next word in the 62-bit preamble is a HOW (hand over word), which contains the number of counted z-epochs. These data contain the time since last "restart" of the GPS time on the previous Sunday 0:00 o'clock.

By way of example, FIG. 1A shows a structure of a sub-frame of a GPS signal, and FIG. 1B shows contents of the TLM and HOW. As illustrated, the preamble is a 62-bit sequence containing two bits (e.g., "00") from the previous sub-frame, alone with the 30-bit TLM and 30-bit HOW.

Obtaining pseudorange measurements by measuring a propagation delay, as described above, may rely on having an accurate clock synchronized to GPS time. If a time uncertainty is less than ±three seconds (e.g., for GPS), which is the duration of a sub-frame in this example, a receiver may obtain an accurate indication of time by detecting the position of a 62-bit preamble of a sub-frame within a demodulated bit stream. For example, detection of the bit position of a 62-bit preamble may be implemented by indication of an exact match of a known 62-bit sequence including the TLM and HOW in a demodulated bit stream. If there is even a single bit corrupted in the 62-bit sequence in the preamble, however, finding an exact match between the known and/or predicted bit sequence and a portion of the preamble may be not possible. Unfortunately, such corruption of bits in a 62-bit sub-frame preamble may not be uncommon in low signal-to-noise environments.

Hence, there is a need for techniques which may provide for or otherwise support reliable, accurate, and/or otherwise robust time-setting in receivers and/or other like devices that receive Satellite Positioning System (SPS) signals.

SUMMARY

In accordance with certain aspects, techniques are provided which may be implemented using various methods and/or apparatuses in a receiver and/or other like electronic device to set a time based on Satellite Positioning System (SPS) and/or other like received signals.

In certain non-limiting example implementations, such techniques may employ a correlation process and a verification process, and/or one or more additional processes to assist in time-setting. In certain non-limiting example implementations, a verification process may be performed to test and/or otherwise consider information resulting from a correlation process.

In certain non-limiting example implementations, a time-setting algorithm may be selected and/or otherwise operatively affected in some manner based, at least in part, on a time uncertainty and/or on a type of demodulation performed on an SPS signal. By way of example but not limitation, different time-setting algorithms may be selected based on a time uncertainty threshold value. By way of example but not limitation, different time-setting algorithms may be selected and/or operatively affected in some manner for different integration modes, such as, e.g., a non-coherent/non-assisted mode, a non-coherent/assisted mode, a coherent/non-assisted mode, a coherent/assisted mode, and/or the like.

In one example implementation, a method may comprise, with an electronic device: receiving a sequence of bits from a signal comprising one or more data sub-frames, correlating a known and/or predicted bit sequence with the received signal at multiple time-shifted hypotheses, verifying a maximum peak in comparison with other peak information resulting from the correlating (e.g., verifying that a ratio of a maximum peak to a next maximum peak resulting from the correlating exceeds a threshold value), detecting a sub-frame preamble in the received signal based, at least in part, on results from the verified maximum peak, and determining a time based, at least in part, on a position of the detected sub-frame preamble in the sequence of bits.

In certain example implementations, a threshold value may be based, at least in part, on at least one of a type of demodulation performed on the signal, a length of an integration period, a number of transmitters associated with the signal, and/or an estimated value of a transmitter's Carrier-to-Noise power ratio.

In certain further example implementations, a method may also comprise, with the electronic device, selecting a time-setting algorithm from among a plurality of time-setting algorithms based, at least in part, on at least one of a time uncertainty and/or a type/mode of demodulation performed on the signal. In certain example implementations, a time-setting algorithm may operatively control all or part of a correlating process and/or all or part of a verifying process.

In certain example implementations, multiple time-shifted hypotheses may be associated with bit positions, and detecting a sub-frame preamble may comprise identifying a bit position associated with a peak correlation result, and determining the time may comprise associating a time with the identified bit position.

In certain example implementations, a method may comprise receiving multiple bit streams from an associated multiple transmitters and/or an associated multiple sub-frames temporally transmitted from one of the SV transmitters, and correlating the known and/or predicted bit sequence with each of the multiple bit streams at the multiple time-shifted hypotheses to provide an associated multiple correlation results for each time-shifted hypothesis. Here, for example, for each time-shifted hypothesis such method may further comprise combining the associated multiple correlation results, and identifying a bit position associated with each combined correlation result.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1A:
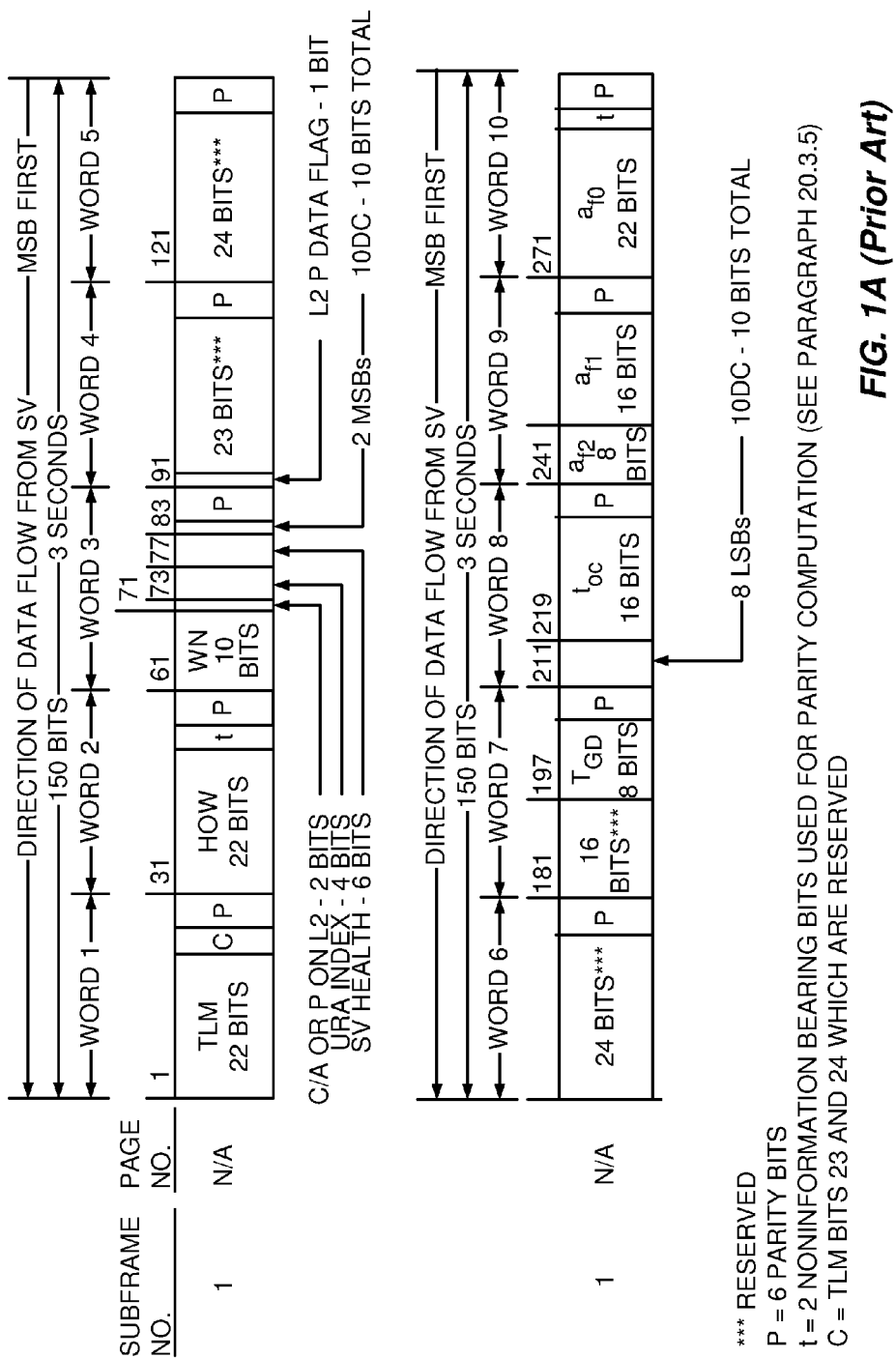
FIG. 1A shows an example structure of a sub-frame of a GPS signal.

Some example techniques are presented herein which may be implemented in various method and apparatuses in a device to support reliable, accurate, and/or otherwise robust time-setting in Satellite Positioning System (SPS) receivers and other like electronic devices.

Some methods and apparatuses are presented herein by way of non-limiting example as time-setting algorithms, which may be used in a GPS receiver and/or other like device (herein after referred to as a "device") to determine or otherwise precisely estimate a GPS time based on one or more received GPS signals from one or more GPS transmitters. In certain example implementations, such a device may be enabled to operate in a stand-alone mode. In other example implementations, such a device may be enabled to obtain assistance from one or more assisting computing devices, e.g., via a wireless communication system.

It should be kept in mind that the example techniques described herein are intended to be adaptable to other SPS. For example, the techniques provided herein may be adapted for use in receivers and/or other like devices that are designed for use with other satellite systems, such as, GLONASS, Galileo, etc.

Some of the example methods and apparatuses described herein may be used in devices that employ different types and/or a plurality of different types of demodulation. For example, some time-setting algorithms are presented for use with coherent demodulation techniques and non-coherent demodulation techniques.

Additionally, some time-setting algorithms are presented herein which may be selectively employed depending on a state of a device. Thus, one or more such algorithms may be invoked to set an SPS time. By way of example, a state of a device may comprise a time uncertainty and one or more corresponding time uncertainty thresholds may be identified and used to determine one or more time-setting algorithms to select.

For example, in certain implementations a device that receives GPS signals may have a time uncertainty threshold of approximately ±three seconds. Here, a time uncertainty threshold of approximately ±three seconds is useful because each sub-frame has duration of six seconds. Hence, in this example, one or more particular time-setting algorithms may be selected which prove useful at times when such device has a time uncertainty that is less than approximately ±three seconds. One or more different time-setting algorithms may, however, be selected which prove useful at times when such device has a time uncertainty that is greater than ±three seconds (e.g., in a GPS example), ±one second (e.g., in a GLONASS example), etc.

Again, these example time uncertainty thresholds are for some example GPS signals; in other devices, applicable time uncertainty thresholds will likely vary depending upon the particular type of SPS signal this is being received and used for time setting. Moreover, there may be more than one time uncertainty threshold and in some instances there may be an overlapping of time uncertainty threshold periods wherein other criteria may be considered in selecting one or more applicable time-setting algorithms. As an additional example, GLONASS operates with two second duration strings, which are much like a sub-frame. For example, there is a "preamble" in the form of a suffix pattern at the end of each string, CRC check bits, and a time counter that is analogous to a z-count in a GPS HOW. Thus, with GLONASS a ±one second period may provide a pivotal threshold between an unambiguous string and an ambiguous string.

Time-setting algorithm selection may also be based on the availability or lack thereof of assistance from one or more network resources. For example, a device may have access to different amounts of information when operating in a TOW assisted mode verses a non-TOW assisted mode, and/or the like. Hence, different time-setting algorithms may be more useful.

Figure 2:
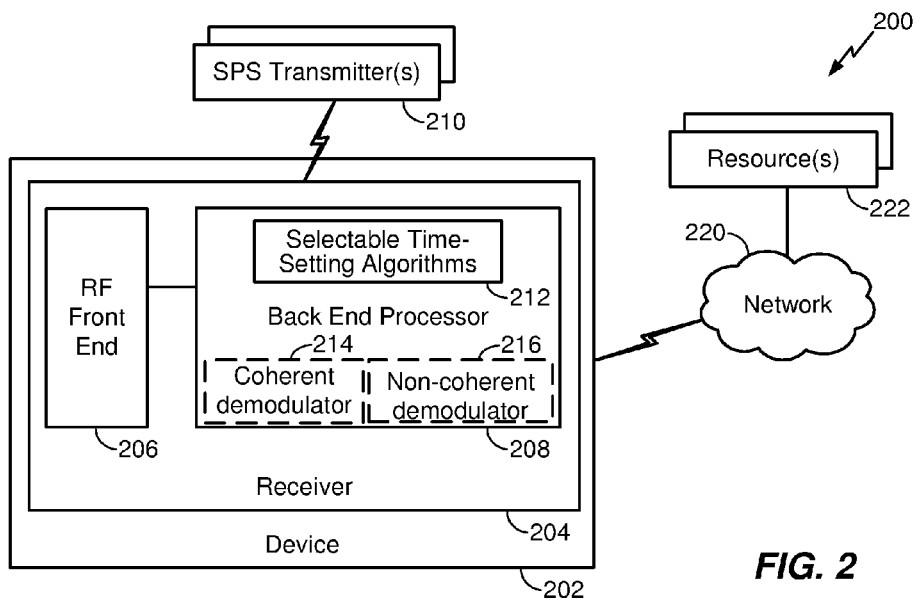
FIG. 2 is a schematic block diagram illustrating an exemplary environment that includes a device to receive SPS signals, in accordance with an implementation.

Attention is now drawn to FIG. 2, which is a schematic diagram showing an example environment 200 having a device 202 comprising a receiver 204 that is capable of receiving one or more signals transmitted by one or more SPS transmitters 210, in accordance with an example implementation. As illustrated further, in certain example implementations, device 202 may also communicate via signals with one or more communication networks 220 and/or other like resources 222.

Device 202 is representative of any electronic device that may function, at least in part, to receive transmitted SPS signals. By way of example but not limitation, device 202 may comprise a computing and/or communication device such as a mobile telephone, smart phone, lap top computer, tablet computer, a personal computer, a wearable computer, a personal digital assistant, a navigation device, etc.

Device 202 may receive SPS signals from various satellites or the like, which may be from a GPS, Galileo, GLONASS, Compass, or other satellite system, a system that uses satellites from a combination of these systems, or any SPS developed in the future, each referred to generally herein as a "Satellite Positioning System" (SPS). Thus, by way of further example, in certain implementations device 202 may receive SPS signals associated with a Regional Navigation Satellite System, such as the Quasi-Zenith Satellite System (QZSS), the Indian Regional Navigational Satellite System (IRNSS), and/or the like.

Furthermore, the methods and apparatuses described herein may be used with position location determination systems that utilize pseudolites or a combination of satellites and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with SPS time. Each such transmitter may be assigned a unique PN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

Receiver 204 may, for example, comprise an RF front end 206 and a back end processor 208. In accordance with certain aspects of the present description, receiver 204 may comprise one or more selectable time setting algorithms 212. In this non-limiting example, one or more selectable time setting algorithms 212 may be operatively provided by or within back end processor 208.

As further illustrated in the example in FIG. 2, receiver 204 may comprise one or more coherent demodulators 214 and/or one or more non-coherent demodulators 216. By way of non-limiting examples, coherent demodulator 214 may comprise a Costas loop and/or the like, and non-coherent demodulator 216 may comprise an Automatic Frequency Control (AFC) loop and/or the like. As mentioned, in certain example implementations, different time-setting algorithms may be selected based, at least in part, on the type of demodulation that is performed.

Figure 3:
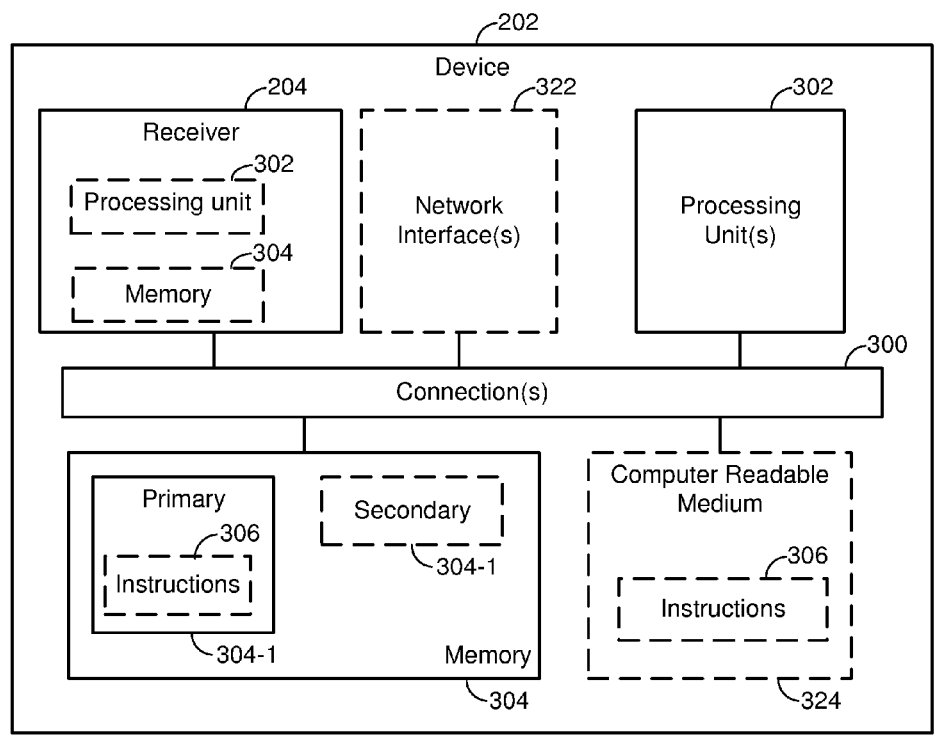
FIG. 3 is a schematic block diagram illustrating certain features of a device, for example as in FIG. 2, in accordance with an implementation.

Attention is drawn next to FIG. 3, which is a schematic diagram showing certain example/optional features that may be provided in a device 202. Here, for example, device 202 may comprise a receiver 204 as mentioned. Receiver 204 may comprise specific circuitry (e.g., analog and/or digital circuitry), and/or programmable logic such as one or more processing units 302 and/or memory 304.

In certain example implementations, device 202 may comprise other circuitry to perform various functions. For example, device 202 may comprise one or more processing units 302, memory 304, network interface 322, and/or computer readable medium 324 with computer readable instructions 306, which may be operatively coupled using one or more connections 300.

Processing units 302 may perform data processing (e.g., in accordance with all or part of the techniques provided herein). Processing unit(s) 302 may be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile device 202. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 324. As illustrated, memory 304 and/or computer readable medium 324 may comprise instructions 306 associated with data processing (e.g., in accordance with the techniques provided herein).

Network interface 222 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. In addition to or as an alternative to such example WWAN, WLAN technologies and the like, in certain example implementations, assistance information (e.g., TOW-Assist, etc.) may be transmitted to device 202 via a broadcast technology such as MediaFLO, ISDB-T, DVB-H, and/or the like.

In certain example implementations, one or more processing units 302 and/or other like circuitry may be enabled to: receive or otherwise obtain at least one sequence of bits associated with at least one SPS signal comprising one or more data sub-frames; perform at least one correlation process using at least one known and/or predicted bit sequence with at least one sequence of demodulated bits or portion thereof at multiple time-shifted hypotheses; perform at least one verification process to verify a maximum peak in comparison with other peak information resulting from the correlation process. For example, to verify a maximum peak, one or more processing units 302 and/or other like circuitry may verify that a ratio (and/or other like metric) associated with a maximum peak to a next maximum peak resulting from the correlation process exceeds a threshold value (e.g., based on the type of demodulation performed). One or more processing units 302 and/or other like circuitry may be enabled to further detect a sub-frame preamble in the received SPS signal based, at least in part, on results from the verification process (e.g., using a verified maximum peak); and/or determine an SPS time based, at least in part, on a position of the detected sub-frame preamble in the sequence of bits.

In certain example implementations, one or more processing units 302 and/or other like circuitry may be further enabled to select a time-setting algorithm from among a plurality of time-setting algorithms based, at least in part, on a time uncertainty and/or a type (e.g., mode) of demodulation performed on the SPS signal. Here, for example, a selected time-setting algorithm may operatively control (e.g., initiate, affect, etc.) a correlation process (e.g., a peak correlation process, etc.), a verification process, a listing process, a decoding process, a relaxation process, and/or a re-verifying process. In certain instances such processes may be combined, for example, a correlation process may comprise all or part of a listing process and/or a decoding process, and a verification process may comprise all or part of a relaxation process, and/or re-verifying process. In certain example implementations, one or more processing units 302 and/or other like circuitry may be further enabled to obtain and/or determine at least one time uncertainty threshold (e.g., associated with an SPS signal), and/or a threshold value (e.g., based on the type of demodulation performed) for use in a verification process. Some examples for these processes are described in greater detail below.

Additionally, instructions and/or data associated with such processes and/or one or more time-setting algorithms may be stored in memory 304, and/or other applicable computer readable medium 324.

As previously mentioned, obtaining pseudorange measurements by measuring a propagation delay may rely on having an accurate clock synchronized to GPS time. If a time uncertainty is less than ±three seconds, which is the duration of a sub-frame in this example, a receiver may obtain an accurate indication of time by detecting the position of a 62-bit preamble of a sub-frame within a demodulated bit stream. For example, detection of the bit position of a 62-bit preamble may be implemented by indication of an exact match of a known 62-bit sequence including the TLM and HOW in a demodulated bit stream. If there is even a single bit corrupted in the 62-bit sequence in the preamble, however, finding an exact match between the known and/or predicted bit sequence and a portion of the preamble may be not possible. Unfortunately, such corruption of bits in a 62-bit sub-frame preamble may not be uncommon in low signal-to-noise environments.

As illustrated in greater detail in several example time-selecting algorithms below, instead of seeking a perfect match with the 62-bit preamble of a sub-frame, in certain example implementations, a 62-bit known and/or predicted bit sequence (e.g., including the known TLM and HOW) may be correlated in time shifted fashion over multiple time-shifted sub-frame position hypotheses (e.g., over 300 hypotheses at associated bit-shifted positions in the sub-frame).

For example, a time shifted hypothesis associated with a highest correlation result may be determined to be the location of the 62-bit preamble within the sub-frame. Alternatively, peak processing may be employed to identify correlation peaks from the correlation results of multiple adjacent sub-frame bit positions.

In certain particular implementations, the strongest and next strongest correlation outputs, and their associated bit positions, may be identified. If the ratio between the strongest and the next strongest peaks is greater than a threshold, the hypotheses corresponding to the maximum peak is declared as corresponding to the sub-frame boundary. Otherwise, the receiver may wait for another six seconds and perform the correlation step again on a subsequent data sub-frame. Correlation outputs at the different hypotheses may be added to the correlation outputs found in the previous step, and the ratio test may be applied again. This process may repeat until a sub-frame boundary is found or until a total number of attempts is reached.

In GPS, space vehicles (SVs) transmit signals in a synchronized fashion (i.e., according to a common, synchronized GPS clock). Here, if an a priori time uncertainty among signals from multiple SVs is less than ±10.0 ms (e.g., half a bit duration), bits demodulated from such signals (from multiple SVs) may be combined to improve performance of the above described technique for detecting a sub-frame preamble. Here, bit sequences received by multiple SVs may be combined, and the combined bit sequences may be correlated with the aforementioned 62-bit known and/or predicted bit sequence. It should be recognized here, for example, that among the sixty two bits, some of the bits may be unknown (e.g., as may be the situation in a non-TOW assisted case). Alternatively, correlation outputs for SVs may be combined for each bit-shifted hypothesis. Then, peak processing may be applied to the outputs combined for the different hypothesis. Peak processing may then be applied to the combined outputs at each different hypothesis.

Figure 1B:
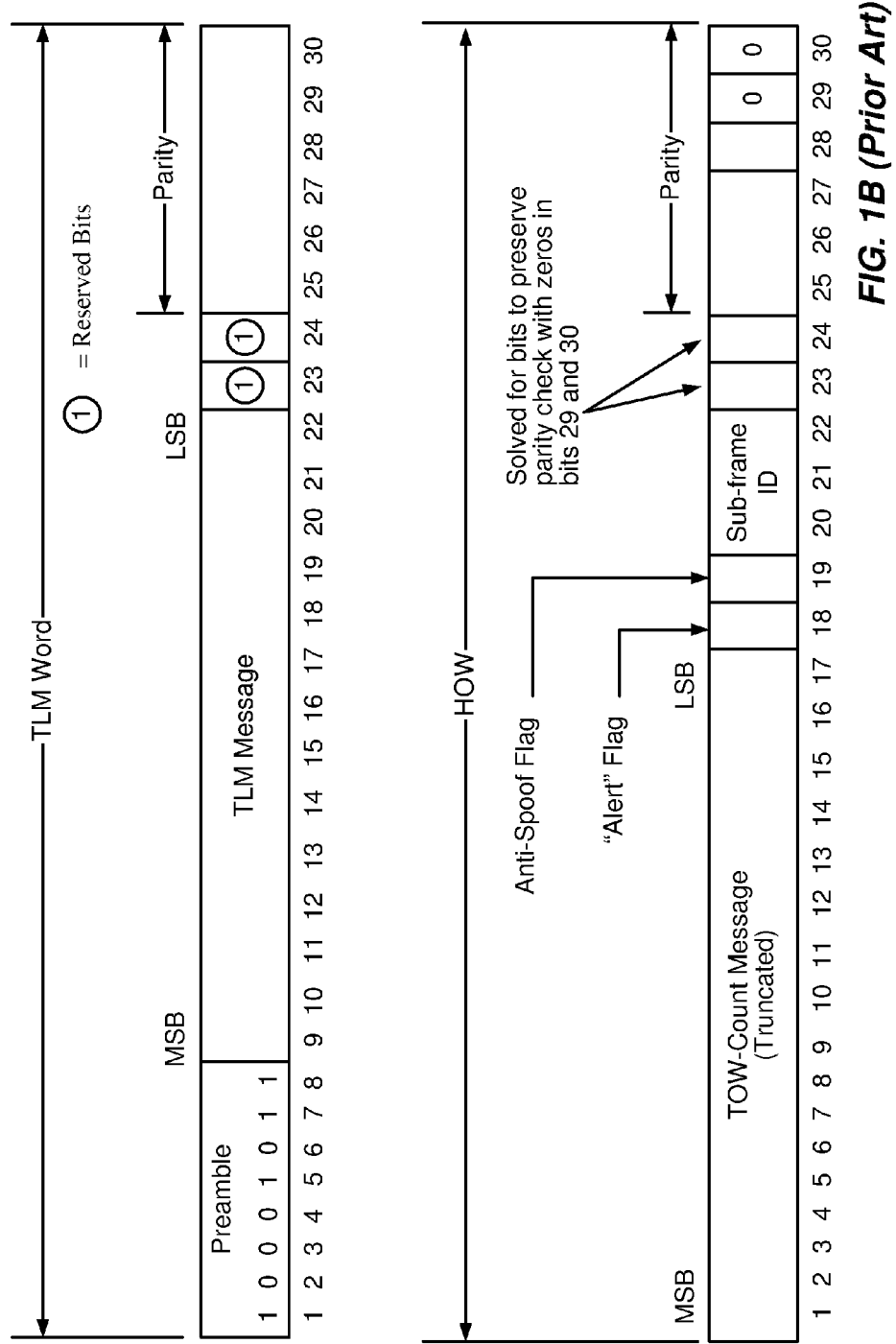
FIG. 1B shows example contents of TLM and HOW words of a GPS signal.

Returning to the example GPS signal as previously described and illustrated in FIG. 1A and FIG. 1B, an output from demodulator engine (e.g., with a demodulator 214 or 216), may comprise a 20.0 ms IQ sums and 20.0 ms dot and cross products.

By denoting the 20.0 ms IQ sum at time k as r(k), one may state write this as:

$$r(k)=I(k)+jQ(k)$$

and the dot product at time k as x(k) as:

$$x(k)=Re(r(k)r(k-1)^*)$$

Note that r(k) is a complex random variable and may be written as $r(k)=Ab(k)e^{j\phi(k)}+n(k)$ where A is the amplitude and b(k) is the information bit at time k and $\phi(k)$ is the phase.

Also note that if a phase loop in a demodulator engine is locked, in a coherent mode the phase should be close to zero or π (there is an 180° phase ambiguity): $\phi(k) \approx 0$ or $\phi(k) \approx \pi$. In a non-coherent mode, when a frequency loop is locked, $\phi(k)$ should vary slowly over time and the following approximation holds $|\phi(k)-\phi(k-1)| \approx 0$.

In this example, GPS signals are organized into frames, each of which consists of 25 sub-frames. The duration of each sub-frame is six seconds. Each sub-frame consists of 10 words. The first word in a sub-frame is the TLM word and the second word in a sub-frame is the HOW word.

Depending on the type of network assistance, device 202 may have knowledge of all the bits or some of the bits in the sub-frame preamble. For example, in certain instances if device 202 is in a TOW assisted mode, with certain assistance messages received from network 220, device 202 may have knowledge of all 62 preamble bits including the last two bits of a previous frame (e.g., usually "00") and the 30-bit TLM and 30-bit HOW.

If device 202 is not in TOW assisted mode, for example, it may be that all or some of the following information is known and/or may be predicted: (a) the last two bits of a previous sub-frame (e.g., "00" in GPS L1 C/A); the 8 preamble bits of the TLM; (c) the first 17 bits of the HOW (TOW count); (d) the 3 bit sub-frame ID of the HOW; (e) bit 18 of the HOW (for healthy SV, e.g., "0" in GPS L1 C/A); and/or bits 29 and 30 of the HOW (e.g., "00" in GPS L1 C/A).

In accordance with one aspect, one may therefore define a known pattern p at receiver 204, for example, as a vector of length 62. Each number in this pattern corresponds to one bit in the preamble of the sub-frame. Thus, for example:

$$p(i) = \begin{cases} 1, & \text{if the corresponding preamble bit} = 0 \\ -1, & \text{if the corresponding preamble bit} = 1 \\ 0, & \text{if the corresponding preamble bit is unknown} \end{cases}$$

For simplicity we will call the above sixty two bits the sub-frame preamble bits.

In a device with non-coherent demodulation, the desired information is carried in a phase transition of a signal. Hence, it may be useful to define a phase transition of a known bit. Let del_p be a phase transition of the preamble bits. The length of del_p is 61 and thus, del_p (k)=p(k)p(k+1), k=1, . . . , 61.

With these example definitions in mind, some example, time-setting algorithms will now be described which may be useful and therefore selected if a time uncertainty is less than a time uncertainty threshold value of approximately ±three seconds (e.g., in a GPS example), ±one second (e.g., in a GLONASS example), etc.

If, for example, a time uncertainty is less than three seconds (e.g., in a GPS example), less than one second (e.g., in a GLONASS example), etc., an example time-setting algorithm may comprise a correlation process and a verification process.

As part of a correlation process, for example, all known bits of the preamble may be collected to form a known bit pattern, e.g., as previously described. This pattern may be used to correlate against a data signal from a demodulation engine, for example, at up to three hundred possible sub-frame position hypotheses.

In accordance with certain aspects, since the GPS SVs in this example are synchronized in transmitting their SPS signals, if an a priori time uncertainty (TUNC)<10.0 ms, for example, one may combine the signals from different SVs in an attempt to improve a time-setting algorithm's performance. The correlation outputs of the SVs at each hypothesis may, for example, be first scaled according to the maximal ratio-combining rule and then added together.

As part of a verification process, a time-setting algorithm may locate a strongest and a next strongest correlation output, for example, e.g., using peak processing and/or other like techniques. If a ratio between a strongest peak and a next strongest peak is greater than a threshold then a hypothesis corresponding to a maximum (max) peak may be declared as the hypothesis corresponding to the sub-frame boundary. Otherwise, the receiver may wait (e.g., for another six seconds), and perform correlation again, and the correlation outputs (e.g., three hundred bit hypotheses) may be added to the correlation outputs of the previous correlation.

As such, in such a verification process, a ratio test may be used to determine whether a ratio of the max peak to the next max peak is greater than a threshold or not. If it is, then the verification process may declare the hypothesis corresponding to the max peak as the sub-frame boundary. The verification process may repeat, however, until a sub-frame boundary is declared (found) or a total number of attempts exceed a prescribed number, for example.

As illustrated in the following additional example implementations, there may be a few differences in such a time-setting algorithm for coherent and non-coherent demodulation.

The following example time-setting algorithm may be selected by a device that employs non-coherent demodulation if a time uncertainty is less than a time uncertainty threshold value of approximately ±three seconds (e.g., in a GPS example), ±one second (e.g., in a GLONASS example), etc.

As part of a correlation process, this example algorithm may employ a buffer of size of three hundred, for example, to hold the correlation outputs. Let $x^l(k)$ be the dot product sample number k from SV l, and attempt be the attempt number that the algorithm is trying to perform the ratio test, for example, as previously described. Here, for example, correlation may be combined across the SV and time (attempt) and may be calculated as:

$$\text{corr}(i) = \sum_{l=1}^{numSVs} \sum_{a=1}^{attempt} \sum_{j=1}^{62} x^l(i+(a-1)\times 300 + j - 1)\text{del\_p}_{i,a}^l(j) \quad (4)$$

where del_$p_{i,a}^l$(j) is the delta pattern number/of SV/corresponding to bit index i, attempt number a.

If the ratio between the max correlation and next max correlation is greater than a threshold thresh(CNo, attempt) then the example verification process may declare the hypothesis corresponding to the max correlation as the true sub-frame boundary. Here, for example, a threshold may be a function of a carrier to noise ratio and an attempt number. In other example implementations, a different technique may be used to identify a desired threshold.

A non-limiting example of pseudo-code for a time-setting algorithm for non-coherent demodulation (e.g., for GPS with TUNC<±three seconds) may comprise:

```
Nbits = 362;
non_coh_sum = zeros(1, Nbits – 62);
for attempt = 1 : NAttempts
        Use delta_iq as the buffer to store the sum of dot products
        from different SVs: delta_iq = zeros(1, Nbits–1);
        for iSV = 1 : NumSVs
                collect Nbits samples of the 20 ms IQ
                and store in iqbuffer(iSV, :)
                calculate the dot products of the 20 ms IQ,
                the results are added up for all SVs
                with a priori TUNC < 3000 km:
                for i = 1 : Nbits–1
                        delta_iq(i) = delta_iq(i)
                        + real(iqbuffer(iSV, i)'*iqbuffer(iSV, i +1));
                end
        end
```

Calculate the correlation of all the hypotheses:

```
        for i = 1 : Nbits – 62
                Construct the pattern of the 62 preamble bits using the
                description in Section 2: pattern = f(i, t_assist)
                Construct the phase change of the pattern:
                for j = 1 : length(pattern)–1
                        delta_pattern(j) = pattern(j) * pattern(j+1);
                end
                non_coh_sum(i) = non_coh_sum(i)
                        + delta_pattern1(j) * delta_iq(i + j –1);
        end
        Find the ratio between the max peak and the next max peak:
        [ord_nc_sum, sum_idx] = sort(non_coh_sum, 'descend');
        if ord_nc_sum(1)/ord_nc_sum(2) >= thresh(attempt)
                Declare sum_idx(1) + 2 as the index of the starting bit of
                the sub-frame
                break;
        end
end
```

By way of further example but not limitation, a threshold may be calculated using an empirical equation, such as:

thresh=max($b\times 0.9^{(CNo-18)}+ 10 \log^{10(attempt)}$,thresh$_{min}$)

where b is a constant depending on the integration mode and $thresh_{min}$ is a particular minimum value of the threshold for the particular integration mode. By way of non-limiting example, depending on the integration mode, a value for b may be greater than 1.0 and/or less than 3.0. Here, for example, some different integration modes may comprise one or more of a non-coherent/non-assisted mode, a non-coherent/assisted mode, a coherent/non-assisted mode, and/or a coherent/assisted mode. Here, CNo may be an estimated value of an SV's Carrier-to-Noise power ratio (C/No). If cross SV combining is enabled, CNo may represent a maximum value of a C/No of all SVs used in combining, for example.

The following example time-setting algorithm may be selected by a device that employs coherent demodulation if a time uncertainty is less than a time uncertainty threshold value of approximately ±three seconds (e.g., in a GPS example), ±one second (e.g., in a GLONASS example), etc.

Here, an example time-setting algorithm for the coherent case may be very similar to its non-coherent counterpart. However, there are some differences between the two.

For example, in this example it is assumed that there is a phase ambiguity 0/π in data signal from a Costas loop and/or the like. As such, the content of HOW is differentially encoded with respect to bit D30* of the TLM. Thus, if bit D30* is not known and there is an error in this bit, the content of HOW will be flipped. Another difference is that the IQ sums will not have been scaled yet. Thus, if combining across SVs, the IQ sums may be scaled prior to the summation.

As a result of the above example reasons, in performing the correlation, if the device is not TOW assisted (e.g., bit D30* of HOW is not known), the algorithm may separate the known bit pattern into two parts depending on whether the bit is affected by HOW's bit D30* or not. The correlation results may then be squared and summed up across the SV and time.

In example situations wherein the device is TOW assisted, the known 62-bit pattern may be used to correlate against the demodulated data signal. The results may then be squared and summed up across the SV and time domain as before. Of course, in this case the algorithm may perform longer integration across the time. By limiting the duration of coherent integration, for example, the device may be more resilient against phase slips and/or the like. In certain implementations, to make the algorithm consistent between the TOW assisted and TOW non-assisted cases, for example, one may chose not to perform the coherent integration over a longer time.

In certain example implementations, one may specifically limit a duration of coherent integration, for example, in situations where known bits may be distributed in clusters. In such situations, for example, one may integrate a signal in small clusters of bits, square the results, and then perform a summation with the results.

Using the same notations as previously, if the device is non-TOW assisted, a correlation may be calculated as:

$$\text{corr}(i) = \sum_{l=1}^{numSVs attempt} \sum_{a=1} \left( \sum_{\substack{j=1:32 \\ j=61:62}} I^l(i+(a-1) \times 300 + j - 1)p_{i,a}^l(j) \right)^2 +$$

$$\left( \sum_{j=33:60} I^l(i+(a-1) \times 300 + j - 1)p_{i,a}^l(j) \right)^2$$

and in a TOW assisted system, the correlation may be calculated as:

$$\text{corr}(i) = \sum_{l=1}^{numSVs attempt} \sum_{a=1} \left( \sum_{j=1:62} I^l(i+(a-1) \times 300 + j - 1)p_{i,a}^l(j) \right)^2$$

where $p_{i,a}^l(j)$ is the bit number j corresponding to bit i of attempt number a.

Upon all the correlation values having been found, a (same) ratio test procedure as in the non-coherent algorithm may be applied to accept/reject a sub-frame boundary hypothesis. Note that the thresholds for this test may be different from those of the non-coherent algorithm as previously shown.

A non-limiting example of pseudo-code for a time-setting algorithm for coherent demodulation (e.g., for GPS with TUNC<±three seconds) may comprise:

Nbits=362;

Use sum to store the correlation outputs; initially the outputs are zero:

```
sum = zeros(1, Nbits − 62);
for attempt = 1 : NAttempts
    for i = 1 : Nbits − 62
        part_sum1 = 0;
        part_sum2 = 0;
        // Combine the signal across SVs
        for iSV = 1 : NumSVs
            Collect Nbits samples of the 20 ms IQ and store in iqbuffer(iSV, :)
            for j = 1 : 62
                if~TOW_assisted
                    // If the correlation mode is non assisted, the last bit of the TLM
                    // word is not known, thus we need to combine the TOW and HOW words
                    // non-coherently, the signal is scaled by sqrt(SNR(iSV))
                    if j <= 32 ||j>60
                        part_sum1 = part_sum1 + sqrt(SNR(iSV))*real (pattern(j) *
                            iqbuffer(iSV, i + j − 1));
                    else
                        part_sum2 = part_sum2 + sqrt(SNR(iSV))*real(pattern(j)*
                            iqbuffer(iSV, i + j − 1));
                    end
                else
                    part_sum1 =   part_sum2 + sqrt(SNR(iSV))*real (pattern(j) *
```

```
                iqbuffer(iSV, i + j - 1));
            end
        end
    end
    sum(i) = sum(i) + part_sum1^2 + part_sum2^2;
end
[ord_sum, sum_idx] = sort(sum, 'descend');
// Perform ratio test
if ord_sum(1)/ord_sum(2) >= thresh(attempt)
    Declare sum_idx(1) + 2 as the index of the starting bit of
    the sub-frame
    break;
end
end
```

In accordance with certain further aspects, some example time-setting algorithms will now be described which may be useful and therefore selected if a time uncertainty exceeds a time uncertainty threshold value of approximately ±three seconds (e.g., in a GPS example), ±one second (e.g., in a GLONASS example), etc.

If, for example, a time uncertainty is greater than ±three seconds (e.g., in a GPS example), ±one second (e.g., in a GLONASS example), etc. an example time-setting algorithm may comprise a listing process, a decoding process, a verification process, and a relaxation process. In certain situations, an additional verification process may be performed.

For example, as part of a listing process, the approximate known bit pattern may be used to correlate against the demodulated data signal and a plurality of strongest candidates may be identified and kept for further processing. By way of example, in certain implementations, such listing process identifies five strongest candidates.

As part of a decoding process, one or more of the plurality of strongest candidates may be used in an attempt to extract the time information. Here, for example, the decoding process may start with a candidate with strongest correlation and work down to a candidate with weaker correlation.

As part of a verification process, the information from the decoding process may be used to verify whether a candidate is deemed to be valid or not. Here, for example, such verification process may be performed on the candidate HOW. In a particular example, a verification process may include use of one or more of: a Hamming CRC, TOW-count and assisted time consistency, TOW-count and sub-frame ID consistency, additional verification to avoid six second errors; and/or other like techniques and/or a combination thereof.

As part of a relaxation process, for example, if a CRC is not passing, then a number (e.g., five) of the smallest dot products (I samples in the coherent demodulation case) of the HOW may be sign flipped one by one, e.g., from the one with smallest magnitude and then the decoding and verification processes may be repeated.

In certain instances, an additional verification process (a re-verifying) may be preformed, for example, because of use of the strong correlation in the content of HOWs between adjacent sub-frames. Thus, even if a word passes all the CRC and consistency checks it might still have a small probability of a six second error (e.g., the last bit of a TOW count may not be correct). As such, such additional verification step may reduce the probability of wrong detections.

The following example time-setting algorithm may be selected by a device that employs non-coherent demodulation if a time uncertainty exceeds a time uncertainty threshold value of approximately ±three seconds (e.g., in a GPS example), ±one second (e.g., in a GLONASS example), etc.

Figure 4:
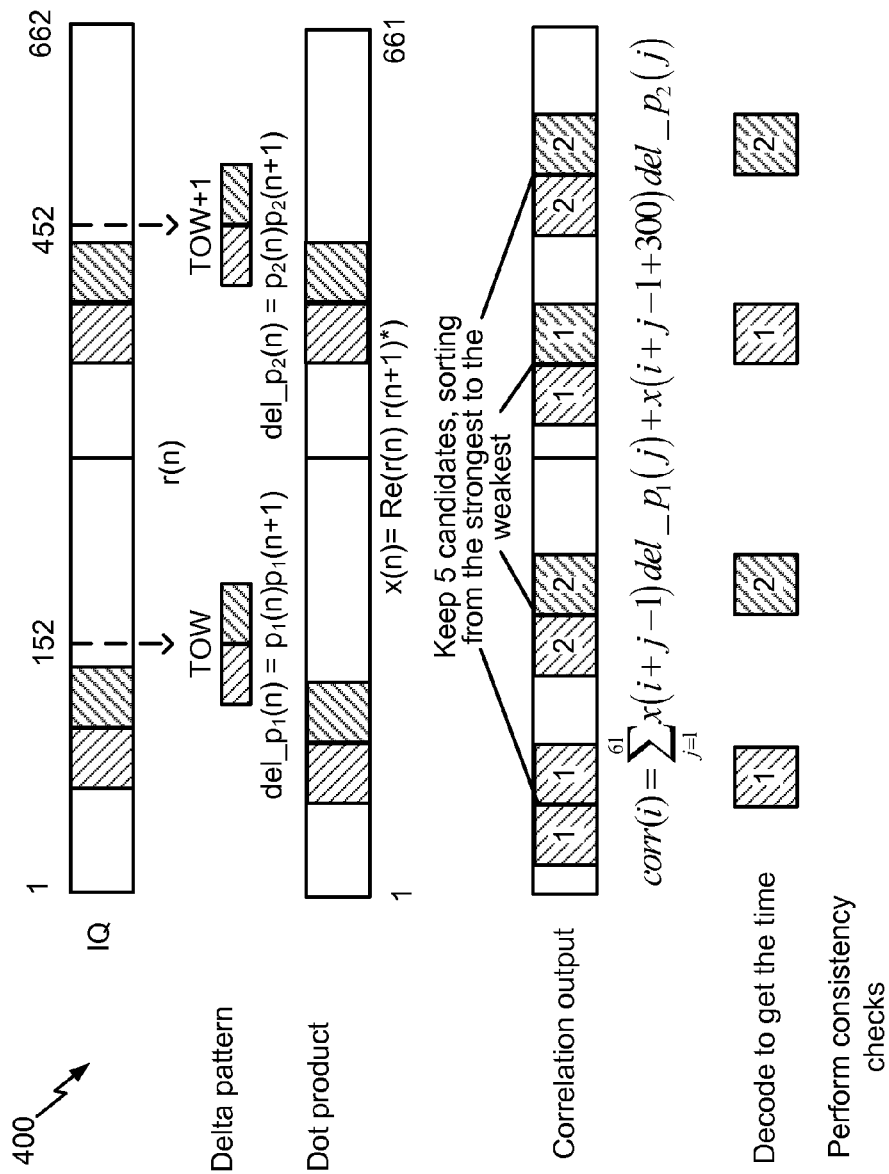
FIG. 4 is an illustrative diagram showing some example processes associated with an example time-setting process that may be selected/performed in a device that uses non-coherent demodulation, in accordance with an implementation.

Reference is made to FIG. 4, which graphically illustrates an example time-setting algorithm as progressing from top to bottom. Here, for example, as part of a listing process a delta bit pattern may be formed and a correlation may be found by performing correlation on two consecutive preambles. As illustrated, samples may be received from two sub-frames and used to perform a verification process and possibly re-verifying, e.g., to avoid six second errors.

Thus, in FIG. 4, the example time-setting algorithm collects 662 IQ samples from the demodulation engine. The IQ samples are used to calculate the 661 dot products. The first delta pattern (del_p$_1$) may be found using the information from the predicted (approximate) TOW-count corresponding to sample number 152 (the center of the first sub-frame, if the first sub-frame starts at the third sample of the collected IQ). The TOW-count corresponds to second delta pattern (del_p$_2$), as it is simply the first TOW-count plus one.

The correlation at three hundred hypotheses may then be computed as:

$$\text{corr}(i) = \sum_{j=1}^{61} x(i+j-1)\text{del\_p}_1(j) + x(i+j-1+300)\text{del\_p}_2(j)$$

Here, x(i) is the dot product of the SV at time i.

If one were to simply apply a correlation and ratio test, there could be six second errors because of the strong correlation between the preambles. Thus, as previously mentioned, it may be useful for such an algorithm to keep K candidates (e.g., K=5, etc.) with highest correlation outputs.

As such, as part of a verification process, the algorithm may consider all K candidates, e.g., starting from the one with the highest correlation output. Thus, for example, for at least one if not each candidate sub-frame preamble, the algorithm may perform and/or consider: (a) Hamming check on a HOW word; (b) a consistency between a TOW count and an assisted time; (c) a consistency between a TOW count and a sub-frame ID; and/or (d) a value of two final bits of a HOW.

Note that for each candidate in this example, there are two HOWs. The algorithm may, therefore, check both of them. If in any of the candidate HOW, all the checks are passing, the algorithm may move to the next process otherwise, the algorithm may sort the dot products of each HOW in increasing order and choose L (e.g., L=5) samples with smallest magnitudes. The algorithm may then process through the list of dot products and may try flipping the sign of each dot product, one by one, performing the CRC and/or other like consistency checks again. If all the checks are passing then the algorithm may perform the next process, otherwise, it may determine that the HOW is not found at the hypothesized location.

Simulation results showed that even applying all the consistency checks the probability of six second errors is nonzero at small C/No (~20 dB-Hz). To avoid this, after the TOW-count is decoded and verified, its correlation output may be compared against those of the two adjacent candidates. Here, for example, one may first construct the bit patterns corresponding to the decoded TOW and the other two candidate patterns corresponding to TOW−1 and TOW+1. The pattern corresponding to TOW may be compared to the patterns corresponding to TOW−1 and TOW+1 in pair-wise manner. Here, for example, one may sample where the two candidate patterns are different and use such patterns at those locations to form the correlations. Let the patterns that correspond to TOW be del_$p_{0,1}$ and del_$p_{0,2}$, the patterns that corresponds to TOW−1 be del_$p_{-1,1}$ del_$p_{-1,2}$.

The correlation metrics in favor of TOW in this example may be:

$$r_0 = \sum_{i=1}^{61} x(i+j-1)\text{del\_}p_{0,1}(j)\delta(\text{del\_}p_{0,1}(j) - \text{del\_}p_{-1,1}(j)) +$$

$$x(i+j-1+300)\text{del\_}p_{0,2}(j)\delta(\text{del\_}p_{0,2}(j) - \text{del\_}p_{-1,2}(j))$$

The correlation metrics in favor of TOW−1 in this example may be:

$$r_{-1} = \sum_{i=1}^{61} x(i+j-1)\text{del\_}p_{-1,1}(j)\delta(\text{del\_}p_{0,1}(j) - \text{del\_}p_{-1,1}(j)) +$$

$$x(i+j-1+300)\text{del\_}p_{-1,2}(j)\delta(\text{del\_}p_{0,2}(j) - \text{del\_}p_{-1,2}(j)),$$

where i is the candidate bit hypothesis previously found and $$\delta(x) = \begin{cases} 1, & x = 0 \\ 0, & \text{otherwise.} \end{cases}$$

Here, $r_0 = r_{-1}$. If $r_0 > r_{-1} + \Delta$, where $\Delta$ is a positive constant, then the algorithm declares that TOW is a possible candidate, otherwise the value of TOW may not used to set the time for the device (e.g., a non negative value which may be a function of the estimated dot product amplitude and the number of samples that the two patterns are not the same).

Applying the same procedure with candidate TOW+1. The surviving TOW (if any) may be used to set time for the device.

In general, the content of HOWs and/or TOWs for different SVs may be different. However, observations have shown that most of the time HOWs/TOWs are the same for different SVs. If the receiver is in TOW assisted mode, it may be possible to perform a check to see whether contents of the HOWs/TOWs are the same or not (e.g., by examining applicable assisted messages). If they are, then cross SV combining may be possible. An example process for this case is similar to the case there is only one single SV, except that the dot product will be a sum of the dot products from different SVs.

The following example time-setting algorithm may be selected by a device that employs coherent demodulation if a time uncertainty exceeds a time uncertainty threshold value of approximately ±three seconds.

Here, for example, a time-setting algorithm may in some respects be similar to the previous example for a non-coherent one, and may comprise of a listing process, a decoding process, a verification process, and a relaxation process (and possibly re-verifying).

Here, the example algorithm may collect 662 I-samples from the demodulation engine (e.g., assuming that the Costas loop has been locked). Since the data contain two sub-frame preambles, two patterns may be computed from assistant data. The first ($p_1$) may be found using information from a predicted (approximate) TOW-count corresponding to sample 152 (e.g., the center of a first sub-frame, if the first sub-frame starts at a third sample of the collected I-samples). The TOW-count corresponding to a second delta pattern ($p_2$) is simply the first TOW-count plus one. Correlation may comprise:

$$\text{corr}(i) = \left| \sum_{j=1}^{P} I(i+j-1)p_1(j) + I(i+j-1+300)p_2(j) \right|^2$$

where P is a variable depending on the receiver mode. If the device is in TOW assisted mode (e.g., TLM and HOW bits are known) then P=62, otherwise P=10. One may choose to exclude all the bits in the HOW from the pattern because the data bit in HOW are differentially encoded with the last bit of the TLM. If this bit is unknown, e.g., as in the case of non-TOW assisted, one may obtain the bit by demodulating the TOW first. However, if a SNR is usually very low such a decode result may lead to an error propagation. If an error occurs, the whole content of the HOW may be flipped and the correlation result will no longer be correct.

The example algorithm may then select K strongest candidates for further processing. The algorithm may process through the list of candidates from the strongest to the weakest, for example. Also, note that there may be a 0/180 degree phase ambiguity at the output of a Costas loop. The phase of the carrier may be determined by the sign of the correlation output at each hypothesis, for example:

$$p(i) = \text{sign}\left[ \sum_{j=1}^{P} I(i+j-1)p_1(j) + I(i+j-1+300)p_2(j) \right]$$

To remove the phase ambiguity, before performing decoding at each hypothesis, the samples in IQ samples may be multiplied with p(i). If the TOW passes the CRC checks, sub-frame ID and TOW count consistency, and TOW count and assisted time consistency then the algorithm may, for example, include a re-verifying process. If the CRC checks are not passed or a consistency is not satisfied, the example algorithm may sort the amplitudes of the HOW's I-samples in increasing order and keep K samples with smallest amplitudes. The algorithm may then process through the list and try flipping the sign of each sample one by one, and perform CRC and TOW consistency checks again. If the checks are passed then the example algorithm may proceed to a re-verifying process.

Here, for example, a re-verifying process may be similar to that in the non-coherent case example. Again, such additional process may be used to avoid six second errors. Thus, for example, the algorithm may construct the bit patterns corresponding to the decoded TOW and the other two candidate patterns corresponding to TOW−1 and TOW+1. The pattern corresponding to TOW may be compared to the patterns corresponding to TOW−1 and TOW+1, e.g., in pair-wise manner.

Let the patterns that correspond to TOW be $p_{0,1}$ and $p_{0,2}$, the patterns that correspond to TOW−1 be $p_{-1,1}$ and $p_{-1,2}$. The correlation metrics, which is in favor of TOW, is:

$$r_0 = \left| \sum_{i=1}^{61} I(i+j-1)p_{0,1}(j)\delta(p_{0,1}(j) - p_{-1,1}(j)) + \right.$$
$$\left. I(i+j-1+300)p_{0,2}(j)\delta(p_{0,2}(j) - p_{-1,2}(j)) \right|$$

and the correlation metrics, which is in favor of TOW−1 is:

$$r_{-1} = \left| \sum_{i=1}^{61} I(i+j-1)p_{-1,1}(j)\delta(p_{0,1}(j) - p_{-1,1}(j)) + \right.$$
$$\left. I(i+j-1+300)p_{-1,2}(j)\delta(p_{0,2}(j) - p_{-1,2}(j)) \right|$$

if $r_0 > r_{-1} + \Delta$ (where $\Delta$ is a non-negative value, for example $\Delta=2$ time the average amplitude of the I samples) then the decision is in favor of TOW, otherwise, the value of TOW is not used to set the time. Note that $\Delta$ may also be a function of a number of locations at which the two patterns differ.

Some example techniques will now be described which may be implemented in a TOW assisted mode with TOW assisted data being available. Here, for example, a time-setting algorithm may comprise multiple hypothesis searches.

If, for example, a time uncertainty is greater than ±three seconds (e.g., in a GPS example), ±one second (e.g., in a GLONASS example), etc. an example time-setting algorithm may comprise defining a one or more search patterns and performing a correlation process, and a verification process to perform ratio test(s). In certain instances, a re-verifying process may be performed to provide an additional soft verification.

Here, for example, as part of a correlation process, a buffer of size six hundred and sixty (or other applicable size) may be used to hold correlation outputs. Let x(k) be a dot product sample number k. If a time uncertainty is ±eight seconds (e.g., for GPS), for example, at each bit hypothesis there may be three possibilities of time. As such, for example, let delta patterns corresponding to these three possibilities be del_$p_1$ (h,i) and del_$p_2$ (h,i), here h is a hypothesis index that may take values 0, 1, or 2, and i is a bit index, and the subscripts 1 and 2 represent an index of first and second sub-frames.

The correlation corresponding to hypothesis h, may be calculated as:

$$\text{corr}(h, i) = \sum_{j=1}^{61} x(i+j-1)\text{del\_}p_1(h, j) + x(i+j-1+300)\text{del\_}p_2(h, j)$$

Since, in this example, there are three time hypotheses and three hundred bit hypotheses, a total number of correlations are nine hundred. The (three) time hypotheses with maximum correlation outputs may be sorted, e.g., in a non-increasing order. The example algorithm may process through the resulting list, performing a verification process, e.g., via ratio test(s) using a ratio of a maximum peak to a next maximum peak and a threshold value. An example algorithm may also employ additional tests, such as, e.g., an additional soft verification. If a hypothesis passes such tests then that hypothesis is used to set time (e.g., by detecting a sub-frame preamble in a corresponding received SPS signal, and determining a SPS time based, at least in part, on a position of the detected sub-frame preamble in a sequence of bits).

In accordance with certain example implementations, a one sub-frame time-setting algorithm or a two sub-frame time-setting algorithm may be used (e.g., depending on an availability of IQ data).

For example, a one sub-frame time-setting algorithm may be used if a time uncertainty is greater than ±three second (e.g., for GPS three seconds≤TUNC≤eight seconds), in a TOW-assisted mode with one sub-frame of data available.

By way of example, a one sub-frame time-setting algorithm may comprise multiple hypothesis tests to search for a sub-frame boundary. Here, for example, given a dot product vector length, there should be one sub-frame boundary among the first three hundred samples. Given a TUNC of ±eight seconds, for example, at each sample hypothesis one may have three possible values for a TOW-count, which may referred to as the three time hypotheses. A TOW-count may, for example, be found by propagating a current time to a corresponding sample. Based, at least in part, on TOW-count values and available TOW assisted data, at each sample hypothesis, one may reconstruct three possible 62-bit preamble patterns. Such patterns may, for example, start with [1, 1], which is the last two zero bits of the previous sub-frame. Note that in certain patterns, a 1 may be used to represent a 0, a −1 may used to represent a 1, and a 0 may be used to represent an unknown bit from the assisted data. In this example, the last sixty bits comprise the TLM and the HOW. In reconstructing a HOW, the following example relation between a TOW-count and a sub-frame ID of a same HOW may be used:

subID=mod(TOW−count−1,5)+1

It is noted that the preceding example equation may be used to determine part of an adjustment of a TOW-Assist 62-bit pattern indicative of an adjacent sub-frame/tow count. In a 30-bit HOW, one may increment (or decrement) a TOW COUNT by one (e.g., modulo 403,200) and increment (or decrement) a SUBFRAME ID by one (e.g., modulo 5) and then re-encode the CRC parity check digits. Here, for example, one may either increment/decrement a sub frame ID directly, using an existing value in the pattern, and/or derive it from the tow count.

From the search patterns, at each sample hypothesis three delta patterns may be formed. The delta patterns may, for example, be formed based on a phase transition of the search patterns. These vectors may, for example, have lengths of sixty one bits. Let dot_prod be the dot product vector and corr be the correlation between the dot product vector and the delta patterns. By way of example, in certain implementations corr may be a two-dimensional vector of size 3 by 300 where 3 is the number of hypotheses at each sample hypothesis and 300 is the number of sample hypotheses for the sub-frame boundary.

A non-limiting example of pseudo-code for calculating a correlation matrix is shown below, e.g., for a 3 by 300 correlation matrix:

```
for (int i = 0; i <300; i++)
{
    Propagate time to the sample i;
    T(i) = The TOW-count which is closest to the sample i assuming
```

```
TUNC=0;
for (int j = 0; j <3; j++)
{
    pattern(j) = reconstruct the preamble corresponding to the
    TOW-count
    value equal mod(T(i)-1 + j, 100800);
    del_pattern(j) = phase transition pattern of pattern(j);
    for (int k = 0; k < 61; k++)
        del_pattern(j, k) = pattern(j, k)*pattern(j, k+1);
    corr( j, i) = 0;
    for (int k = 0; k <61; k++)
        corr( j, i) = corr(j, i) + del_pattern(j, k)*dot_prod(i+k);
}
}
```

As a correlation matrix is found for each time hypothesis (note that in this example one may have 3 time hypotheses and 300 sample hypotheses), a one sub-frame time-setting algorithm may look for a sample with maximum correlation output and one with the next maximum correlation output. Such time-setting algorithm may sort maximum correlation outputs in decreasing order, for example, from a beginning to an end of the list. For each element in the list, if the ratio between the maximum correlation and next maximum correlation outputs is greater than a threshold then the corresponding time and sample hypotheses may be identified for use as a candidate to set a time.

A non-limiting example of pseudo-code for such a ratio test algorithm may comprise:

```
for (int i = 0; i <3; i++)
    [max_corr(i), max_idx(i) ]= max(corr(i, :));
idx_list = index of time hypothesis in non-increasing order of max_corr;
pass_ratio_test = false;
for (int i = 0; i <3; i++)
{
    hyp = idx_list (i);
    if max(corr(hyp,:))/next_max(corr(hyp,:)) > 2.0 +0.1*i
    {
        pass_ratio_test = true;
        break;
    }
}
if (pass_ratio_test)
    if (one_sf_soft_verify(hyp,)
        Use [hyp, max_idx(hyp)] to set time;
```

Such a candidate may, for example, be further tested, using an additional soft verification process before being used to set time. Since the preambles are highly correlated, an additional soft verification process (e.g., comprising a one_sf_soft_verify(i) function) may be used to perform additional verification logic to avoid certain errors (e.g., six second errors).

One may have high confidence about a sub-frame boundary but a confidence on TOW-count value corresponding to the boundary may be low. The algorithm may compare the candidate (sample) hypothesis with the other two competing hypotheses. This may be done, for example, by performing correlation between the candidate pattern, against the dot product vector at locations where the candidate pattern and the competing pattern are different. By way of example, a candidate pattern may be accepted if the correlation output is greater than or equal to a threshold (e.g., 0.5 times number of differences in the two patterns times the estimated dot product amplitude).

Because the TLM message may change during a time-setting attempt (although this is a very rare event), to avoid the change of such message making the correlation low which can lead to errors in detecting the true peak, the dot products corresponding to the TLM message and the CRC of the TLM word may also correlated against the dot product vector. Here, for example, a hypothesis may be accepted if such correlation is greater than a threshold, e.g., 11 (which in this example is the length of the TLM message plus the CRC divides 2) times the estimated dot product amplitude.

A non-limiting example of pseudo-code for such additional soft verification process for one sub-frame may comprise:

```
bool one_sf_soft_verify(hyp)
ampld = sum(dot_prod(0:255))/256;
for (int k = 0; k < 3; k++)
{
    if (k != hyp)
    {
        masked_corr = 0;
        diff_count = 0;
        for (int i = 0; i < 61; i++)
            if (del_pattern(hyp, i) != del_pattern(k, i))
            {
                masked_corr = masked_corr + del_pattern(hyp, i)
                    *dot_prod(max_idx(hyp)+i);
                diff_count += 1;
            }
        if (masked_corr < 0.5*diff_count*ampld;
    }
    tlm_corr = 0;
    for (int i = 9; i <=31; i++)
        tlm_corr += del_pattern(hyp, i)*dot_prod(max_idx(hyp)+i);
    if (tlm_corr < 11*ampld)
        return false;
    return true;
}
```

An example two sub-frame time-setting algorithm will now be described. This example two sub-frame time-setting algorithm may be used if a time uncertainty is greater than ±three second (e.g., for GPS three seconds≤TUNC≤eight seconds), in a TOW-assisted mode with two sub-frames of data available.

Here, for example, a two sub-frame time-setting algorithm may also use multiple hypothesis tests, which are very similar to the algorithm described above in the example one sub-frame time-setting algorithms. One difference may be that a two sub-frame time-setting algorithm as its name implies uses two sub-frames of samples rather than one.

Here, for example, a (661-bit or other applicable length) dot product vector may be used by the two sub-frame time-setting algorithm to search for a sub-frame boundary. For such a dot product vector length, there should be one sub-frame boundary among the first three hundred samples and there should b one other sub-frame boundary in the second three hundred samples. Given a TUNC of ±eight seconds, for example, at each sample hypothesis one may have (at maximum) three possible values for the TOW-count (e.g., the three time hypotheses). The TOW-count may be found, for example, by propagating the current time to the corresponding sample. From the TOW-count values and the TOW assisted data, at each sample hypothesis one may reconstruct three possible 62-bit preamble patterns. Here, for example, such patterns may start with [1, 1] which is the last two zero bits of the previous sub-frame. As in the previous example, in certain patterns a 1 may be used to represent a 0, a −1 may used to represent a 1, and a 0 may be used to represent an unknown bit from the assisted data. In this example, the last sixty bits comprise the TLM and the HOW. As the sub-frames boundaries in this example are three hundred samples apart, one may calculate the TOW-count values corresponding to the samples in the next three hundred samples by adding one to the corresponding first TOW-count values. The corresponding 62-bit preamble search patterns may also be constructed in the same way as in the previous example.

From the search patterns, at each sample hypothesis the 3 delta patterns may be formed which comprise supper patterns having the two 62-bit search patterns. The delta patterns may be formed based on the phase transition of the search patterns, for example. The resulting vectors in this example may also have lengths of sixty one bits. Let dot_prod be the dot product vector and corr be the correlation between the dot product vector and the delta patterns. The correlation matrix, corr, is a two-dimensional vector of size 3 by 300 where is the number of hypotheses at each sample hypothesis and 300 is the number of sample hypotheses for the sub-frame boundary. Here, for example, a correlation may be performed for both search patterns corresponding to each sample hypothesis.

A non-limiting example of pseudo-code for calculating such a correlation matrix may comprise:

```
for (int i = 0; i <300; i++)
{
    Propagate time to the sample i;
    T(i) = The TOW-count which is closest to the sample i assuming TUNC=0;
    for (int j = 0; j <3; j++)
    {
        // reconstruct the patterns for each sample/time hyp.
        pattern1(j) = reconstruct the preamble corresponding to the
            TOW-count value equal mod(T(i)−1 + j, 100800);
        pattern2(j) = reconstruct the preamble corresponding to the
            TOW-count value equal mod(T(i) +j, 100800);
        // del_pattern1(j) = phase transition pattern of pattern1(j)
        // del_pattern2 (j) = phase transition pattern of pattern2(j)
        for (int k = 0; k < 61; k++)
        {
            del_pattern1(j, k) = pattern1(j, k)*pattern1(j, k+1);
            del_pattern2(j, k) = pa
        }
        // calculate the correlation
        corr( j, i) = 0;
        for (int k = 0; k <61; k++)
            corr( j, i) = corr(j, i) + del_pattern1(j, k)*dot_prod(i+k)
                + del_pattern2(j, k)*dot_prod(i+k+300);
    }
}
```

Once the correlation matrix is found, for each time hypothesis (e.g., here there are 3 time hypotheses and 300 sample hypotheses) the example two sub-frame time-setting algorithm may look for a sample with maximum correlation output and another sample with the next maximum correlation output. The example two sub-frame time-setting algorithm may sort the maximum correlation outputs, e.g., in decreasing order from a beginning to an end of the list. For each element in the list, if a ratio between the maximum correlation and next maximum correlation outputs is greater than a threshold then the corresponding time and sample hypotheses may identified as a candidate to set time.

A non-limiting example of pseudo-code for a ratio test algorithm may comprise:

```
        for (int i = 0; i <3; i++)
            [max_corr(i), max_idx(i) ]= max(corr(i, :));
        // The list of 3 max peaks in sample hypothesis domain
        idx_list = indeces of time hypothesis in non-increasing order of
        max_corr;
```

```
        pass_ratio_test = false;
        for (int i = 0; i <3; i++)
        {
            hyp = idx_list (i);
            if max(corr(hyp,:))/next_max(corr(hyp,:)) > 1.8 +0.1*i
            {
                pass_ratio_test = true;
                break;
            }
        }
        if (pass_ratio_test)
            if (two_sf_soft_verify(hyp,)
                use [hyp, max_idx(hyp)] to set time;
```

Similar to the previous example, in certain example implementations, a candidate may be further tested using an additional soft verifying algorithm. Since, in this example the preambles are highly correlated, a two sub-frame time-setting algorithm may comprise a two_sf_soft_verify(i) function to perform additional verification logic to avoid certain errors (e.g., six second errors).

As previously mentioned, one may have high confidence about the sub-frame boundary but the confidence on TOW-count value corresponding to the boundary may be low. Thus, a two sub-frame time-setting algorithm may be enabled to compare the candidate hypothesis with the other two competing hypotheses. This may be accomplished, for example, at least in part by performing correlation between the candidate pattern, against the dot product vector at samples where the candidate pattern and the competing pattern are different. The candidate pattern may pass such test if, for example, the correlation output is greater than or equal to a threshold (e.g., 0.5 times number of differences in the two patterns times the estimated dot product amplitude). Because the TLM message may change during a time-setting attempt (again this should be a rare event), to avoid the change of such message making the correlation low which can lead to errors in detecting the true peak, the dot products corresponding to the TLM message and the CRC of the TLM word may also be correlated against the patterns.

Here, a non-limiting example of pseudo-code for an additional soft verifying algorithm may comprise:

```
bool two_sf_soft_verify(hyp)
ampld = sum(dot_prod(0:511))/512;
for (int k = 0; k < 3; k++)
{
    if (k !=hyp)
    {
        masked_corr = 0;
        diff_count = 0;
        for (int i = 0; i < 61; i++)
        {
            if (del_pattern1(hyp, i) != del_pattern1(k, i))
            {
                masked_corr = masked_corr + del_pattern1(hyp, i)
                    *dot_prod(max_idx(hyp)+i);
                diff_count += 1;
            }
            if (del_pattern2(hyp, i) != del_pattern2(k, i))
            {
                masked_corr = masked_corr + del_pattern2(hyp, i)
                    *dot_prod(max_idx(hyp)+i +300);
                diff_count +=1;
            }
        }
        if (masked_corr < 0.5*diff_count*ampld)
            return false;
    }
}
```

```
        tlm_corr = 0;
        for (int i = 9; i <=31; i++)
            tlm_corr += del_pattern1(hyp, i)*dot_prod(max_idx(hyp)+i)
                + del_pattern2(hyp, i)*dot_prod(max_idx(hyp)+i + 300);
        if (tlm_corr < 22*ampld)
            return false;
        return true;
}
```

As described, in certain examples, e.g., for GPS where a TUNC is ±eight seconds, there may be multiple (e.g., three) hypotheses on six-second sub-frame start times. Such techniques and algorithms may be extended for other TUNCS. For example if a TUNC is ±ten seconds, then there may be four possible six-second-separated sub-frame start times. Thus, in certain instances there may be multiple six-second start time hypotheses which may be managed, for example, responsive to the size of an a priori time uncertainty.

The content of TOWs for different SVs may be different. However, as mentioned previously, TOWs are often the same for different SVs. If the receiver is in TOW assisted mode, it may be possible to perform a check to determine whether the contents of the HOWs/TOWs are the same or not. If they are, then cross SV combining may be possible, e.g., when attempting to combine TOWs for use in decoding. In certain other example implementations, however, one may combine across SVs even if the content in HOWs/TOWs does not match. For example, in certain implementations, there may be no need for the bits from different SVs to match to form a correlation (both coherently and/or non-coherently). Indeed, in certain example implementations, each SV may use its own pattern to match with its dot products and the correlation outputs from multiple SVs may be combined to form a final correlation, e.g., as presented herein in the example algorithms for TUNC=±three seconds.

The processing to combine across SVs may, for example, be similar to the case where there is only one single SV, except that the I samples are now the scaled sum of the I sample.

$$I(k) = \sum_{iSV=1}^{nSV} p_{iSV} \sqrt{SNR_{iSV}} \, I_{iSV}(k)$$

where $p_{iSV}$ is used to remove the phase ambiguity of the Costa loop of SV number iSV, $SNR_{iSV}$ is the SNR of SV number iSV and $I_{iSV}(k)$ is the kth sample of SV number iSV.

Figure 5:
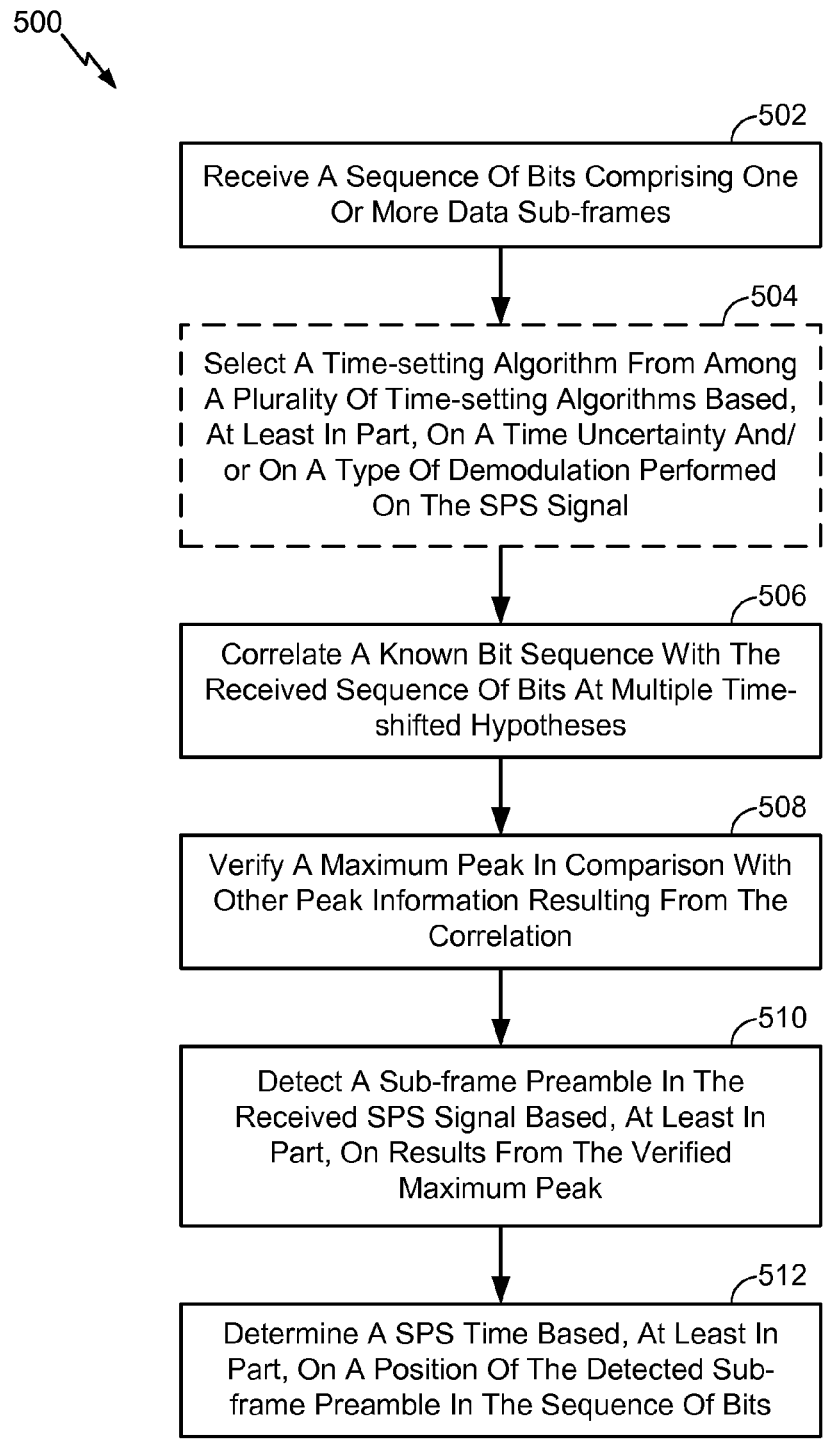
FIG. 5 is a flow diagram illustrating certain features of an exemplary process for use in a device to set or otherwise determine a time based on SPS signals, in accordance with an implementation.

Attention is drawn next to FIG. 5, which shows a process 500 that may be used in a device 202 to support time-setting.

At block 502, a sequence of bits comprising one or more data sub-frames may be received and/or otherwise obtained. For example, the sequence of bits may be received from a demodulating engine and/or obtained from memory.

At block 504, which is optional, a time-setting algorithm may be selected from among a plurality of time-setting algorithms based, at least in part, on a time uncertainty and/or on a type of demodulation performed on the SPS signal.

At block 506 a known and/or predicted bit sequence may be correlated with the received sequence of bits at multiple time-shifted hypotheses. At block 508, a maximum peak may be verified in comparison with other peak information resulting from correlation. For example, a ratio of a maximum peak to a next maximum peak resulting from correlation may undergo verification to verify that the ratio exceeds a threshold value. In certain example implementations, a time-setting algorithm selected at block 504 may operatively control and/or otherwise affect operation of one or more of the correlation performed at block 506 and/or verification performed at block 508. By way of example, several time-setting algorithms are described herein which may be selected and which operatively control and/or affect at least the correlation process and/or verification process.

At block 510 a sub-frame preamble in the received SPS signal may be detected based, at least in part, on results from the verified maximum peak. At block 512 a SPS time may be determined based, at least in part, on a position of the detected sub-frame preamble in the sequence of bits.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying" and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A computer-readable (storage) medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising: with an electronic device:
    receiving a sequence of bits from a Satellite Positioning System (SPS) signal comprising one or more data sub-frames;
    selecting a time-setting algorithm from among a plurality of time-setting algorithms based, at least in part, on a time uncertainty;
    correlating a known and/or predicted bit sequence with said received SPS signal at multiple time-shifted hypotheses;
    verifying a maximum peak in comparison with other peak information resulting from said correlating;
    detecting a sub-frame preamble in said received SPS signal based, at least in part, on results from said verified maximum peak; and
    generating one or more electrical signals representing an SPS time based, at least in part, on a position of said detected sub-frame preamble in said sequence of bits,
    wherein at least one of said correlating and/or said verifying is affected by said time-setting algorithm.

2. The method as recited in claim 1, wherein verifying said maximum peak further comprises:
    verifying that a ratio of said maximum peak to a next maximum peak resulting from said correlating exceeds a threshold value.

3. The method as recited in claim 1, further comprising: with said electronic device:
    selecting said time-setting algorithm based, at least in part, on a time uncertainty threshold associated with the SPS signal.

4. The method as recited in claim 3, wherein said time uncertainty exceeds a time uncertainty threshold and said selected time-setting algorithm selectively initiates at least one of a listing process and/or a decoding process as part of said correlating.

5. The method as recited in claim 3, wherein said time uncertainty exceeds a time uncertainty threshold and said selected time-setting algorithm selectively initiates a relaxation process as part of said verifying.

6. The method as recited in claim 3, wherein said time uncertainty exceeds a time uncertainty threshold and said selected time-setting algorithm selectively initiates a re-verifying process.

7. The method as recited in claim 2, wherein said threshold value is based, at least in part, on at least one of:
    a type of demodulation performed on said SPS signal;
    a length of an integration period;
    a number of space vehicles (SVs) associated with said SPS signal; or
    an estimated value of an SV's Carrier-to-Noise power ratio (C/No).

8. The method as recited in claim 1, wherein said multiple time-shifted hypotheses are associated with bit positions, and wherein said detecting said sub-frame preamble comprises:

identifying a bit position associated with a peak correlation result.

9. The method as recited in claim 8, and wherein generating said one or more electrical signals representing said SPS time comprises associating said SPS time with said identified bit position.

10. The method as recited in claim 1, and further comprising: with said electronic device:
   receiving multiple bit streams from at least one of: an associated multiple satellite vehicle (SV) transmitters, and/or an associated multiple sub-frames from one of said SV transmitters;
   correlating said known and/or predicted bit sequence with each of said multiple bit streams at said multiple time-shifted hypotheses to provide an associated multiple correlation results for each time-shifted hypothesis;
   for each time-shifted hypothesis, combining said associated multiple correlation results; and
   identifying a bit position associated with each combined correlation result.

11. An apparatus for use in an electronic device, the apparatus comprising:
   means for receiving a sequence of bits from a Satellite Positioning System (SPS) signal comprising one or more data sub-frames;
   means for selecting a time-setting algorithm from among a plurality of time-setting algorithms based, at least in part, on a time uncertainty;
   means for correlating a known and/or predicted bit sequence with said received SPS signal at multiple time-shifted hypotheses;
   means for verifying a maximum peak in comparison with other peak information resulting from said correlating;
   means for detecting a sub-frame preamble in said received SPS signal based, at least in part, on results from said verified maximum peak; and
   means for determining a SPS time based, at least in part, on a position of said detected sub-frame preamble in said sequence of bits,
   wherein at least one of said means for correlating and/or said means for verifying is affected by said time-setting algorithm.

12. The apparatus as recited in claim 11, wherein said means for verifying said maximum peak comprises means for verifying that a ratio of said maximum peak to a next maximum peak resulting from said correlating exceeds a threshold value.

13. The apparatus as recited in claim 11, further comprising:
   means for selecting said time-setting algorithm based, at least in part, on a time uncertainty threshold associated with the SPS signal.

14. The apparatus as recited in claim 13, wherein said time uncertainty exceeds a time uncertainty threshold and said selected time-setting algorithm selectively initiates at least one of means for listing and/or means for decoding as part of said means for correlating.

15. The apparatus as recited in claim 14, wherein said time uncertainty exceeds a time uncertainty threshold and said selected time-setting algorithm selectively initiates means for relaxation as part of said means for verifying.

16. The apparatus as recited in claim 13, wherein said time uncertainty exceeds a time uncertainty threshold and said selected time-setting algorithm selectively initiates means for re-verifying process.

17. The apparatus as recited in claim 12, wherein said threshold value is based, at least in part, at least one of:
   a type of demodulation performed on said SPS signal;
   a length of an integration period;
   a number of space vehicles (SVs) associated with said SPS signal; or
   an estimated value of an SV's Carrier-to-Noise power ratio (C/No).

18. The apparatus as recited in claim 11, wherein said multiple time-shifted hypotheses are associated with bit positions, and wherein said means for detecting said sub-frame preamble comprises:
   means for identifying a bit position associated with a peak correlation result.

19. The apparatus as recited in claim 11, and wherein said means for determining said SPS time comprises associating said SPS time with said identified bit position.

20. The apparatus as recited in claim 11, and further comprising:
   means for receiving multiple bit streams from at least one of: an associated multiple satellite vehicle (SV) transmitters, and/or an associated multiple sub-frames from one of said SV transmitters;
   means for correlating said known and/or predicted bit sequence with each of said multiple bit streams at said multiple time-shifted hypotheses to provide an associated multiple correlation results for each time-shifted hypothesis;
   for each time-shifted hypothesis, means for combining said associated multiple correlation results; and
   means for identifying a bit position associated with each combined correlation result.

21. An apparatus comprising:
   at least one processing unit to: obtain a sequence of bits from a Satellite Positioning System (SPS) signal comprising one or more data sub-frames; select a time-setting algorithm from among a plurality of time-setting algorithms based, at least in part, on a time uncertainty; correlate a known and/or predicted bit sequence with said received SPS signal at multiple time-shifted hypotheses; verify a maximum peak in comparison with other peak information resulting from said correlating; detect a sub-frame preamble in said received SPS signal based, at least in part, on results from said verified maximum peak; and determine a SPS time based, at least in part, on a position of said detected sub-frame preamble in said sequence of bits, wherein said time-selecting algorithm affects said at least one processing unit in performing at least one of said correlation and/or said verification.

22. The apparatus as recited in claim 21, said at least one processing unit to verify said maximum peak by verifying that a ratio of said maximum peak to a next maximum peak resulting from said correlating exceeds a threshold value.

23. The apparatus as recited in claim 21, said at least one processing unit to further select said time-setting algorithm based, at least in part, on a time uncertainty threshold associated with the SPS signal.

24. The apparatus as recited in claim 23, wherein said time uncertainty exceeds a time uncertainty threshold and said selected time-setting algorithm selectively initiates at least one of a listing process and/or a decoding process as part of said correlation.

25. The apparatus as recited in claim 23, wherein said time uncertainty exceeds a time uncertainty threshold and said selected time-setting algorithm selectively initiates a relaxation process as part of said verification.

26. The apparatus as recited in claim 23, wherein said time uncertainty exceeds a time uncertainty threshold and said selected time-setting algorithm selectively initiates a re-verifying process.

27. The apparatus as recited in claim 22, wherein said threshold value is based, at least in part, on at least one of:
- a type of demodulation performed on said SPS signal;
- a length of an integration period;
- a number of space vehicles (SVs) associated with said SPS signal; or
- an estimated value of an SV's Carrier-to-Noise power ratio (C/No).

28. The apparatus as recited in claim 21, wherein said multiple time-shifted hypotheses are associated with bit positions, and wherein said at least one processing unit to further identify a bit position associated with a peak correlation result.

29. The apparatus as recited in claim 28, and wherein said determining said SPS time comprises associating said SPS time with said identified bit position.

30. The apparatus as recited in claim 21, said at least one processing unit to further:
- obtain multiple bit streams from at least one of: an associated multiple satellite vehicle (SV) transmitters, and/or an associated multiple sub-frames from one of said SV transmitters;
- correlate said known and/or predicted bit sequence with each of said multiple bit streams at said multiple time-shifted hypotheses to provide an associated multiple correlation results for each time-shifted hypothesis;
- for each time-shifted hypothesis, combine said associated multiple correlation results; and
- identify a bit position associated with each combined correlation result.

31. An article comprising:
a non-transitory computer readable medium having stored therein computer-implementable instructions executable by one or more processing units to:
- obtain a sequence of bits from a Satellite Positioning System (SPS) signal comprising one or more data sub-frames;
- select a time-setting algorithm from among a plurality of time-setting algorithms based, at least in part, on a time uncertainty;
- correlate a known and/or predicted bit sequence with said received SPS signal at multiple time-shifted hypotheses;
- verify a maximum peak in comparison with other peak information resulting from said correlating;
- detect a sub-frame preamble in said received SPS signal based, at least in part, on results from said verified maximum peak; and
- determine a SPS time based, at least in part, on a position of said detected sub-frame preamble in said sequence of bits,
- wherein said time-selecting algorithm affects said one or more processing units in performing at least one of said correlation and/or said verification.

32. The article as recited in claim 31, said computer-implementable instructions being further executable by said one or more processing units to verify said maximum peak by verifying that a ratio of said maximum peak to a next maximum peak resulting from said correlating exceeds a threshold value.

33. The article as recited in claim 32, said computer-implementable instructions being further executable by said one or more processing units to further select said time-setting algorithm based, at least in part, on a time uncertainty threshold associated with the SPS signal.

34. The article as recited in claim 33, wherein said time uncertainty exceeds a time uncertainty threshold and said selected time-setting algorithm selectively initiates at least one of a listing process and/or a decoding process as part of said correlation.

35. The article as recited in claim 33, wherein said time uncertainty exceeds a time uncertainty threshold and said selected time-setting algorithm selectively initiates a relaxation process as part of said verification.

36. The article as recited in claim 33, wherein said time uncertainty exceeds a time uncertainty threshold and said selected time-setting algorithm selectively initiates a re-verifying process.

37. The article as recited in claim 32, wherein said threshold value is based, at least in part, at least one of:
- a type of demodulation performed on said SPS signal;
- a length of an integration period;
- a number of space vehicles (SVs) associated with said SPS signal; or
- an estimated value of an SV's Carrier-to-Noise power ratio (C/No).

38. The article as recited in claim 31, wherein said multiple time-shifted hypotheses are associated with bit positions, and wherein said at least one processing unit to further identify a bit position associated with a peak correlation result.

39. The article as recited in claim 38, and wherein said determining said SPS time comprises associating said SPS time with said identified bit position.

40. The article as recited in claim 31, said computer-implementable instructions being further executable by said one or more processing units to further:
- obtain multiple bit streams from at least one of: an associated multiple satellite vehicle (SV) transmitters, and/or an associated multiple sub-frames from one of said SV transmitters;
- correlate said known and/or predicted bit sequence with each of said multiple bit streams at said multiple time-shifted hypotheses to provide an associated multiple correlation results for each time-shifted hypothesis;
- for each time-shifted hypothesis, combine said associated multiple correlation results; and
- identify a bit position associated with each combined correlation result.

41. A method comprising: with an electronic device:
- receiving a sequence of bits from a Satellite Positioning System (SPS) signal comprising one or more data sub-frames;
- selecting a time-setting algorithm from among a plurality of time-setting algorithms based, at least in part, on a type of demodulation performed on said SPS signal;
- correlating a known and/or predicted bit sequence with said received SPS signal at multiple time-shifted hypotheses;
- verifying a maximum peak in comparison with other peak information resulting from said correlating;
- detecting a sub-frame preamble in said received SPS signal based, at least in part, on results from said verified maximum peak; and
- generating one or more electrical signals representing an SPS time based, at least in part, on a position of said detected sub-frame preamble in said sequence of bits,
- wherein at least one of said correlating and/or said verifying is affected by said time-setting algorithm.

42. The method as recited in claim 41, wherein said type of demodulation performed on said SPS signal comprises at least one of coherent demodulation and non-coherent demodulation.

43. The method as recited in claim 41, and further comprising: with said electronic device:
  receiving multiple bit streams from at least one of: an associated multiple satellite vehicle (SV) transmitters, and/or an associated multiple sub-frames from one of said SV transmitters;
  correlating said known and/or predicted bit sequence with each of said multiple bit streams at said multiple time-shifted hypotheses to provide an associated multiple correlation results for each time-shifted hypothesis;
  for each time-shifted hypothesis, combining said associated multiple correlation results; and
  identifying a bit position associated with each combined correlation result.

44. An apparatus for use in an electronic device, the apparatus comprising:
  means for receiving a sequence of bits from a Satellite Positioning System (SPS) signal comprising one or more data sub-frames;
  means for selecting a time-setting algorithm from among a plurality of time-setting algorithms based, at least in part, on a type of demodulation performed on said SPS signal;
  means for correlating a known and/or predicted bit sequence with said received SPS signal at multiple time-shifted hypotheses;
  means for verifying a maximum peak in comparison with other peak information resulting from said correlating;
  means for detecting a sub-frame preamble in said received SPS signal based, at least in part, on results from said verified maximum peak; and
  means for determining a SPS time based, at least in part, on a position of said detected sub-frame preamble in said sequence of bits,
  wherein at least one of said means for correlating and/or said means for verifying is affected by said time-setting algorithm.

45. The apparatus as recited in claim 44, wherein said type of demodulation performed on said SPS signal comprises at least one of coherent demodulation and non-coherent demodulation.

46. The apparatus as recited in claim 44, and further comprising:
  means for receiving multiple bit streams from at least one of: an associated multiple satellite vehicle (SV) transmitters, and/or an associated multiple sub-frames from one of said SV transmitters;
  means for correlating said known and/or predicted bit sequence with each of said multiple bit streams at said multiple time-shifted hypotheses to provide an associated multiple correlation results for each time-shifted hypothesis;
  for each time-shifted hypothesis, means for combining said associated multiple correlation results; and
  means for identifying a bit position associated with each combined correlation result.

47. An apparatus comprising:
  at least one processing unit to: obtain a sequence of bits from a Satellite Positioning System (SPS) signal comprising one or more data sub-frames; select a time-setting algorithm from among a plurality of time-setting algorithms based, at least in part, on a type of demodulation performed on said SPS signal; correlate a known and/or predicted bit sequence with said received SPS signal at multiple time-shifted hypotheses; verify a maximum peak in comparison with other peak information resulting from said correlating; detect a sub-frame preamble in said received SPS signal based, at least in part, on results from said verified maximum peak; and determine a SPS time based, at least in part, on a position of said detected sub-frame preamble in said sequence of bits, wherein said time-selecting algorithm affects said at least one processing unit in performing at least one of said correlation and/or said verification.

48. The apparatus as recited in claim 47, wherein said type of demodulation performed on said SPS signal comprises at least one of coherent demodulation and non-coherent demodulation.

49. The apparatus as recited in claim 47, said at least one processing unit to further: obtain multiple bit streams from at least one of: an associated multiple satellite vehicle (SV) transmitters, and/or an associated multiple sub-frames from one of said SV transmitters; correlate said known and/or predicted bit sequence with each of said multiple bit streams at said multiple time-shifted hypotheses to provide an associated multiple correlation results for each time-shifted hypothesis; for each time-shifted hypothesis, combine said associated multiple correlation results; and identify a bit position associated with each combined correlation result.

50. An article comprising:
  a non-transitory computer readable medium having stored therein computer-implementable instructions executable by one or more processing units to:
    obtain a sequence of bits from a Satellite Positioning System (SPS) signal comprising one or more data sub-frames;
    select a time-setting algorithm from among a plurality of time-setting algorithms based, at least in part, on a type of demodulation performed on said SPS signal;
    correlate a known and/or predicted bit sequence with said received SPS signal at multiple time-shifted hypotheses;
    verify a maximum peak in comparison with other peak information resulting from said correlating;
    detect a sub-frame preamble in said received SPS signal based, at least in part, on results from said verified maximum peak; and
  determine a SPS time based, at least in part, on a position of said detected sub-frame preamble in said sequence of bits,
    wherein said time-selecting algorithm affects said one or more processing units in performing at least one of said correlation and/or said verification.

51. The article as recited in claim 50, wherein said type of demodulation performed on said SPS signal comprises at least one of coherent demodulation and non-coherent demodulation.

52. The article as recited in claim 50, said computer-implementable instructions being further executable by said one or more processing units to further:
  obtain multiple bit streams from at least one of: an associated multiple satellite vehicle (SV) transmitters, and/or an associated multiple sub-frames from one of said SV transmitters;
  correlate said known and/or predicted bit sequence with each of said multiple bit streams at said multiple time-shifted hypotheses to provide an associated multiple correlation results for each time-shifted hypothesis;
  for each time-shifted hypothesis, combine said associated multiple correlation results; and
  identify a bit position associated with each combined correlation result.

* * * * *